(12) United States Patent
Jung et al.

(10) Patent No.: US 11,994,772 B1
(45) Date of Patent: May 28, 2024

(54) LIQUID CRYSTAL DISPLAY DEVICE

(71) Applicant: LG Display Co., Ltd., Seoul (KR)

(72) Inventors: Sung-Hyun Jung, Paju-si (KR);
Chul-Goo Son, Paju-si (KR);
Dong-Jun Cho, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/475,449

(22) Filed: Sep. 27, 2023

(30) Foreign Application Priority Data

Nov. 23, 2022 (KR) .......................... 10-2022-0158675

(51) Int. Cl.
*G02F 1/13357* (2006.01)

(52) U.S. Cl.
CPC .. *G02F 1/133605* (2013.01); *G02F 1/133603* (2013.01)

(58) Field of Classification Search
CPC .............. G02F 1/133605; G02F 1/133603
USPC ........................................................ 349/67
See application file for complete search history.

(56) References Cited

U.S. PATENT DOCUMENTS 8,587,747 B2 * 11/2013 Kim .................. G02F 1/133611
349/67

FOREIGN PATENT DOCUMENTS

KR 10-2003-0038876 A 5/2003
KR 10-1204906 B1 11/2012

* cited by examiner

*Primary Examiner* — Charles S Chang
(74) *Attorney, Agent, or Firm* — POLSINELLI PC

(57) ABSTRACT

A liquid crystal display device includes a bottom cover; a backlight unit disposed over the bottom cover and including a light source and a reflector sheet; and a liquid crystal panel disposed over the backlight unit, wherein the reflector sheet includes first and second sheet portions adjacent to each other in a first direction and at least one first reflective tape fixing the first and second sheet portions, and wherein the at least one first reflective tape includes a plurality of cutouts extending in a second direction perpendicular to the first direction.

17 Claims, 10 Drawing Sheets

LIQUID CRYSTAL DISPLAY DEVICE

CROSS-REFERENCE TO RELATED APPLICATION

The present application claims the priority of Korean Patent Application No. 10-2022-0158675 filed on Nov. 23, 2022, which is hereby incorporated by reference in its entirety.

BACKGROUND

Field of the Disclosure

The present disclosure relates to a display device, and more particularly, to a liquid crystal display device having a relatively large size.

Description of the Background

As the information society is in progress, a demand for display devices that display images increases in various forms, and flat panel display devices (FPD) such as liquid crystal display (LCD) devices and organic light emitting diode (OLED) display devices have been developed and applied to various fields.

Among the flat panel display devices, liquid crystal display devices have been widely used because of their compact size, light weight, thin thickness, low power driving, and the like.

The liquid crystal display devices use optical anisotropy and dielectric anisotropy of liquid crystal and include two substrates, a liquid crystal layer between the two substrates, and a pixel electrode and a common electrode for driving liquid crystal molecules of the liquid crystal layer. The liquid crystal display devices control the arrangement of the liquid crystal molecules by an electric field generated by applying a voltage to the pixel electrode and the common electrode and display images by the light transmittance changed accordingly. The liquid crystal display devices have been widely applied to portable devices such as cellphones or multimedia devices, monitors for notebooks or computers, and large televisions.

Recently, a large-sized liquid crystal display device with a larger area has been required to provide various contents and implement a realistic screen.

To provide this large-sized liquid crystal display device, the size of the components should increase, and the equipment for manufacturing each component should also increase. However, in the case of a component formed using a mold, it is difficult to produce the component as a single configuration due to the limited size of the mold. Accordingly, some components of the large-sized liquid crystal display device are manufactured by dividing, and various problems may occur in the process of joining and applying the divided portions.

In particular, when the components of the backlight unit for supplying light are divided and manufactured, it affects the luminance of the liquid crystal display device, and mura occurs at the joined part of the divided portions, resulting in uneven luminance.

SUMMARY

Accordingly, the present disclosure is directed to a liquid crystal display device that substantially obviates one or more of problems due to limitations and disadvantages described above.

More specifically, the present disclosure is to provide a liquid crystal display device having a relatively large size.

In addition, the present disclosure is to prevent mura of a large-sized liquid crystal display device.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a liquid crystal display device includes a bottom cover; a backlight unit disposed over the bottom cover and including a light source and a reflector sheet; and a liquid crystal panel disposed over the backlight unit, wherein the reflector sheet includes first and second sheet portions adjacent to each other in a first direction and at least one first reflective tape fixing the first and second sheet portions, and wherein the at least one first reflective tape includes a plurality of cutouts extending in a second direction perpendicular to the first direction.

It is to be understood that both the foregoing general description and the following detailed description are explanatory and by way of examples and are intended to provide further explanation of the disclosure as claimed without limiting its scope.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principles of the disclosure.

In the drawings.

DETAILED DESCRIPTION

Figure 1:
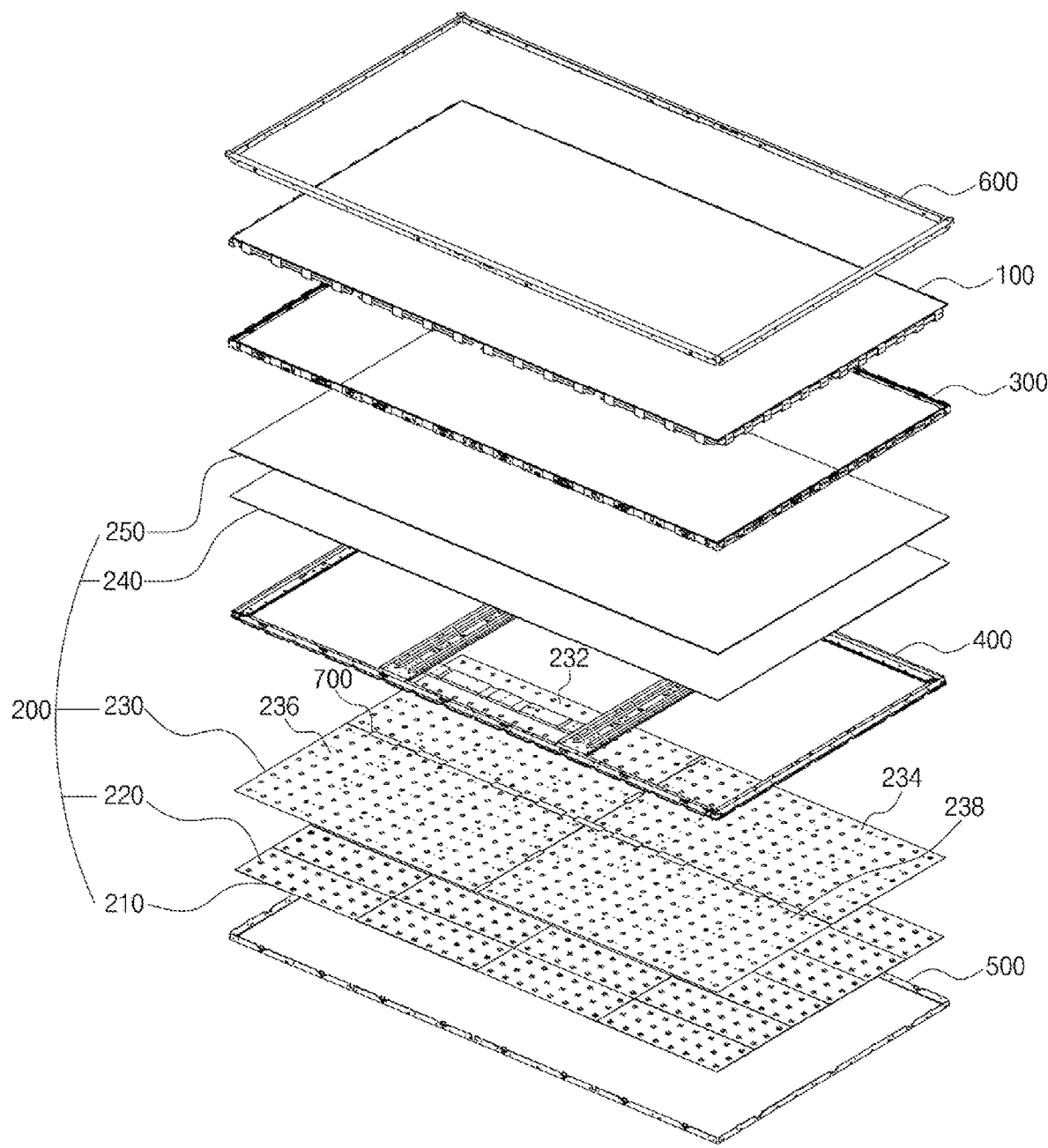
FIG. 1 is a schematic exploded perspective view of a liquid crystal display device according to an aspect of the present disclosure.

Advantages and features of the present disclosure and methods for achieving them will be made clear from aspects described in detail below with reference to the accompanying drawings. The present disclosure may, however, be implemented in many different forms and should not be construed as being limited to the aspects set forth herein, and the aspects are provided such that this disclosure will be thorough and complete and will fully convey the scope of the present disclosure to those skilled in the art to which the present disclosure pertains.

Shapes, sizes, ratios, angles, numbers, and the like disclosed in the drawings for describing the aspects of the present disclosure are illustrative, and thus the present disclosure is not limited to the illustrated matters. The same reference numerals refer to the same components throughout this disclosure. Further, in the following description of the present disclosure, when a detailed description of a known related art is determined to unnecessarily obscure the gist of the present disclosure, the detailed description thereof will be omitted herein. When terms such as "including," "having," "consisting of," and the like mentioned in this disclosure are used, other parts may be added unless the term "only" is used herein. When a component is expressed as being singular, being plural is included unless otherwise specified.

In analyzing a component, an error range is interpreted as being included even when there is no explicit description.

In describing a positional relationship, for example, when a positional relationship of two parts is described as being "on," "above," "below," "next to," or the like, unless "immediately" or "directly" is used, one or more other parts may be located between the two parts.

Although the terms first, second, and the like are used to describe various components, these components are not substantially limited by these terms. These terms are used only to distinguish one component from another component. Therefore, a first component described below may substantially be a second component within the technical spirit of the present disclosure.

Features of various aspects of the present disclosure may be partially or entirely united or combined with each other, technically various interlocking and driving are possible, and each of the aspects may be independently implemented with respect to each other or implemented together in a related relationship.

Reference will now be made in detail to aspects of the present disclosure, examples of which are illustrated in the accompanying drawings.

Figure 2:
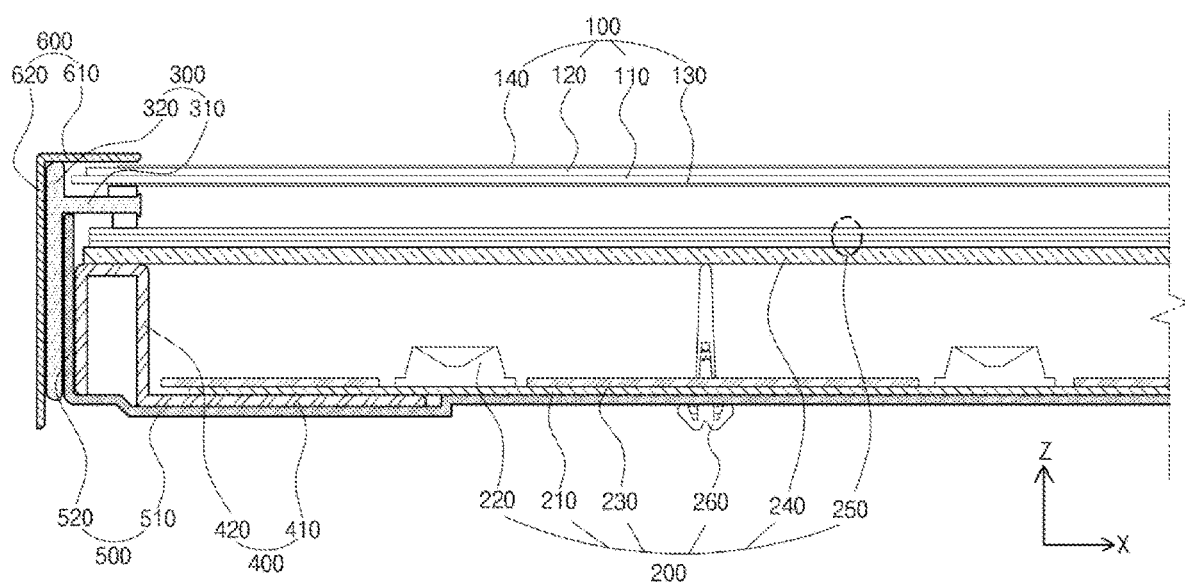
FIG. 2 is a schematic cross-sectional view of a liquid crystal display device according to an aspect of the present disclosure.

FIG. 1 is a schematic exploded perspective view of a liquid crystal display device according to an aspect of the present disclosure. FIG. 2 is a schematic cross-sectional view of a liquid crystal display device according to an aspect of the present disclosure and illustrates a part of the liquid crystal display device according to an aspect of the present disclosure.

In FIG. 1 and FIG. 2, the liquid crystal display device according to the aspect of the present disclosure may include a liquid crystal panel 100, a backlight unit 200, a guide panel 300, a support main 400, a bottom cover 500, and a top cover 600. The guide panel 300, the support main 400, the bottom cover 500, and the top cover 600 may be joined to each other by a fastening means such as a screw.

The liquid crystal panel 100 may include a first substrate 110 at a lower position, a second substrate 120 at an upper position, and a liquid crystal layer interposed between the first and second substrates 110 and 120.

Although not shown in the figures, the first substrate 110 may include a plurality of gate lines and a plurality of data lines on an inner surface thereof, and the gate lines and the data lines may cross each other to define a plurality of pixel regions. A thin film transistor, a pixel electrode, and a common electrode may be provided at each pixel region. The thin film transistor may be connected to the gate line and the data line, and the pixel electrode may be connected to the thin film transistor. The pixel electrode and the common electrode may generate an electric field to drive liquid crystal molecules of the liquid crystal layer. This first substrate 110 may be referred to as an array substrate.

In addition, although not shown in the figures, the second substrate 120 may include a black matrix, a color filter layer, and an overcoat layer on an inner surface thereof. The black matrix may have openings corresponding to respective pixel regions, and one of red, green, and blue color filters of the color filter layer may include may be disposed to correspond to each opening of the black matrix. This second substrate 120 may be referred to as a color filter substrate.

A first polarizer 130 may be attached to an outer surface of the first substrate 110, that is, a lower surface of the first substrate 110, and the second polarizer 140 may be attached to an outer surface of the second substrate 120, that is, an upper surface of the second substrate 120 in the context of the figures. In the figures, the first polarizer 130 may be disposed under the first substrate 110, and the second polarizer 140 may be disposed over the second substrate 120. The first polarizer 130 and the second polarizer 140 may transmit linearly-polarized light only parallel to respective transmission axes. The transmission axis of the first polarizer 130 may be perpendicular to the transmission axis of the second polarizer 140.

The backlight unit 200 may be disposed under the liquid crystal panel 100 to provide light to the liquid crystal panel 100. The backlight unit 200 may include a printed circuit board (PCB) 210, a plurality of light emitting diodes LEDs 220, a reflector sheet 230, a diffuser plate 240, and an optical sheet 250.

The backlight unit 200 may be a direct type in which the LEDs 220 of a light source is disposed right under the liquid crystal panel 100.

Each of the LEDs 220 may be mounted on the printed circuit board 210 in the form of a package including an LED chip and a lens.

The printed circuit board 210 may supply signals to the LEDs 220. The printed circuit board 210 may be provided in plural, and a plurality of LEDs 220 may be mounted on each printed circuit board 210.

The reflector sheet 230 may be provided over the printed circuit board 210. The reflector sheet 230 may have holes corresponding to the LEDs 220, and the LEDs 220 are arranged in the respective holes. Accordingly, the reflector sheet 230 may reflect light from the LEDs 220 toward the liquid crystal panel 100. In addition, light reflected by the liquid crystal panel 100 or other components over the LEDs 220 and traveling toward the reflector sheet 230 may be reflected by the reflector sheet 230 again and then may be sent back to the liquid crystal panel 100, thereby increasing the light efficiency.

Here, the reflector sheet 230 may include a plurality of sheet portions, for example, first, second, third, and fourth sheet portions 232, 234, 236, and 238, and this will be described in detail later.

The diffuser plate 240 may be disposed over the reflector sheet 230. The diffuser plate 240 may be spaced apart from the LEDs 220 and the reflector sheet 230 with a predetermined distance and may uniformly diffuse light from the LEDs 220.

In this case, as shown in FIG. 2, the backlight unit 200 may further include a support member 260 to uniformly maintain a space between the LEDs 220 and the diffuser plate 240. The support member 260 may have a lower end part penetrating the bottom cover 500 and the printed circuit board 210 and an upper end part contacting a lower surface of the diffuser plate 240, thereby supporting the diffuser plate 240.

The optical sheet 250 may be disposed over the diffuser plate 240. The optical sheet 250 may include at least one diffusion sheet and at least one light-concentrating sheet such that more uniform surface light source may be incident on the liquid crystal panel 100 by diffusing or concentrating the light passing through the diffuser plate 240.

For example, the optical sheet 250 may include two light-concentrating sheets and one diffusion sheet sequentially disposed over the diffuser plate 240. The light-concentrating sheets may include prism patterns or lenticular patterns. In this case, one of the light-concentrating sheets may include lenticular patterns, and the other may include prism patterns.

Meanwhile, the optical sheet 250 may further include a brightness enhancement film in which layers having different refractive indexes are alternately stacked or may include the brightness enhancement film instead of the diffusion sheet.

The liquid crystal panel 100 and the backlight unit 200 may be fastened and supported by the guide panel 300, the support main 400, the bottom cover 500, and the top cover 600.

First, the liquid crystal panel 100 may be fastened on the guide panel 300. The guide panel 300 may be formed along lateral edges of the liquid crystal panel 100, thereby having a planar structure of a substantially square frame shape.

The guide panel 300 may include a first guide portion 310 and a second guide portion 320. The first guide portion 310 may be a horizontal portion extending in an X direction, and the second guide portion 320 may be a vertical portion extending in a Z direction. The first guide portion 310 may extend from one side of the second guide portion 320, and a length from a bottom end of the second guide portion 320 to the first guide portion 310 may be longer than a length from a top end of the second guide portion 320 to the first guide portion 310.

The support main 400 may be disposed under the guide panel 300. The support main 400 may have a planar structure of a substantially square frame shape. The support main 400 may include a first support portion 410 and a second support portion 420.

The first support portion 410 may extend in the X direction and may be disposed between the reflector sheet 230 and the bottom cover 500. The second support portion 420 may extend from an end of the first support portion 410 and may include at least one vertical part and at least one horizontal part. For example, the second support portion 420 may include two vertical parts and one horizontal part therebetween and may have a cross-section of a substantially U-like shape inverted up and down.

The diffuser plate 240 may be disposed on the second support portion 420. Specifically, an edge of the lower surface of the diffuser plate 240 may be disposed on the horizontal part of the second support portion 420. Accordingly, the diffuser plate 240 and the optical sheet 250 may be disposed between the second support portion 420 and the first guide portion 310, and the second support portion 420 may be in contact with the lower surface of the diffuser plate 240, thereby supporting the diffuser plate 240 and the optical sheet 250.

The support main 400 may be made of plastic and formed through molding. For example, the support main 400 may be formed of white polycarbonate (PC). Alternatively, the support main 400 may be formed of metal and may be formed of aluminum (Al), stainless steel (SUS), or electrolytic galvanized iron (EGI), for example.

The bottom cover 500 may be provided under the support main 400. The bottom cover 500 may include a first bottom portion 510 and the second bottom portion 520. The first bottom portion 510 may be a horizontal plane and may extend substantially in the X direction. The first bottom potion 510 may have at least one bent part to place various components necessary for driving the liquid crystal panel 100, for example, a driving printed circuit board and the like.

Alternatively, the support main 400 may further include an extension part disposed under the first bottom portion 510 of the bottom cover 500, and the components such as the driving printed circuit board and the like may be disposed between the extension part of the support main 400 and the first bottom portion 510. In this case, the second bottom portion 520 may be disposed between two vertical parts of the second support portion 420.

The second bottom portion 520 may be a vertical plane and may extend in the Z direction. The second bottom portion 520 may be bended from an edge of the first bottom portion 510. The second bottom portion 520 may be disposed between the guide panel 300 and the support main 400, more particularly, between the second guide portion 320 and the second support portion 420.

The bottom cover 500 may be formed of metal, and may be formed of aluminum (Al) or electrolytic galvanized iron (EGI), for example. However, the present disclosure is not limited thereto, and the bottom cover 500 may be formed of stainless steel (SUS).

Meanwhile, the top cover 600 may be provided over the liquid crystal panel 100. The top cover 600 may have a planar structure of a substantially square frame shape. The top cover 600 may include a first top portion 610 and a second top portion 620. The first top portion 610 may be a horizontal portion extending in an X direction, and the second top portion 620 may be a vertical portion extending in a Z direction. The top cover 600 may have a cross-section of a substantially L-like shape inverted up and down.

The first top portion 610 may cover edges of a front surface of the liquid crystal panel 100 and expose a central portion of the front surface of the liquid crystal panel 100, so that an image implemented by the liquid crystal panel 100 may be displayed to the outside. The second top portion 620 may cover outer lateral surfaces of the guide panel 300, more particularly, outer surfaces of the second guide portion 320.

The top cover 600 may be assembled and combined together with the guide panel 300, the support main 400, and the bottom cover 500, so that the liquid crystal display device of the present disclosure may be modularized. Alternatively, the top cover 600 may be omitted.

Here, the top cover 600 may be referred to as a top frame, case top, or top case, and the bottom cover 500 may be referred to as a cover bottom or bottom frame. In addition, the guide panel 300 may be referred to as a main frame, and the support main 400 may be referred to as a main support.

The liquid crystal display device according to an aspect of the present disclosure may have a relatively large size, and for example, a diagonal length of the device may be more than 50 inches. In this case, it is difficult to manufacture the component of the backlight unit 200 as a single configuration. Specially, it is difficult to form the reflector sheet 230 as a single configuration because the reflector sheet 230 has the plurality of holes corresponding to the plurality of LEDs 220, as described above.

Specifically, the reflector sheet 230 may be formed of plastic, for example, polyethylene terephthalate (PET). The plurality of holes may be formed by simultaneous blanking or punching. Here, when a certain number of holes, for example, 150 or more holes are formed in one sheet, it is difficult to form the reflector sheet 230 at once due to strong blanking or punching pressure.

Accordingly, the reflector sheet 230 according to an aspect of the present disclosure may be divided into the plurality of sheet portions, for example, into the first, second, third, and fourth sheet portions 232, 234, 236, and 238, and the first, second, third, and fourth sheet portions 232, 234, 236, and 238 may be fixed to each other by reflective tapes 700. This will be described with reference to FIG. 3 and FIGS. 4A and 4B.

Figure 3:
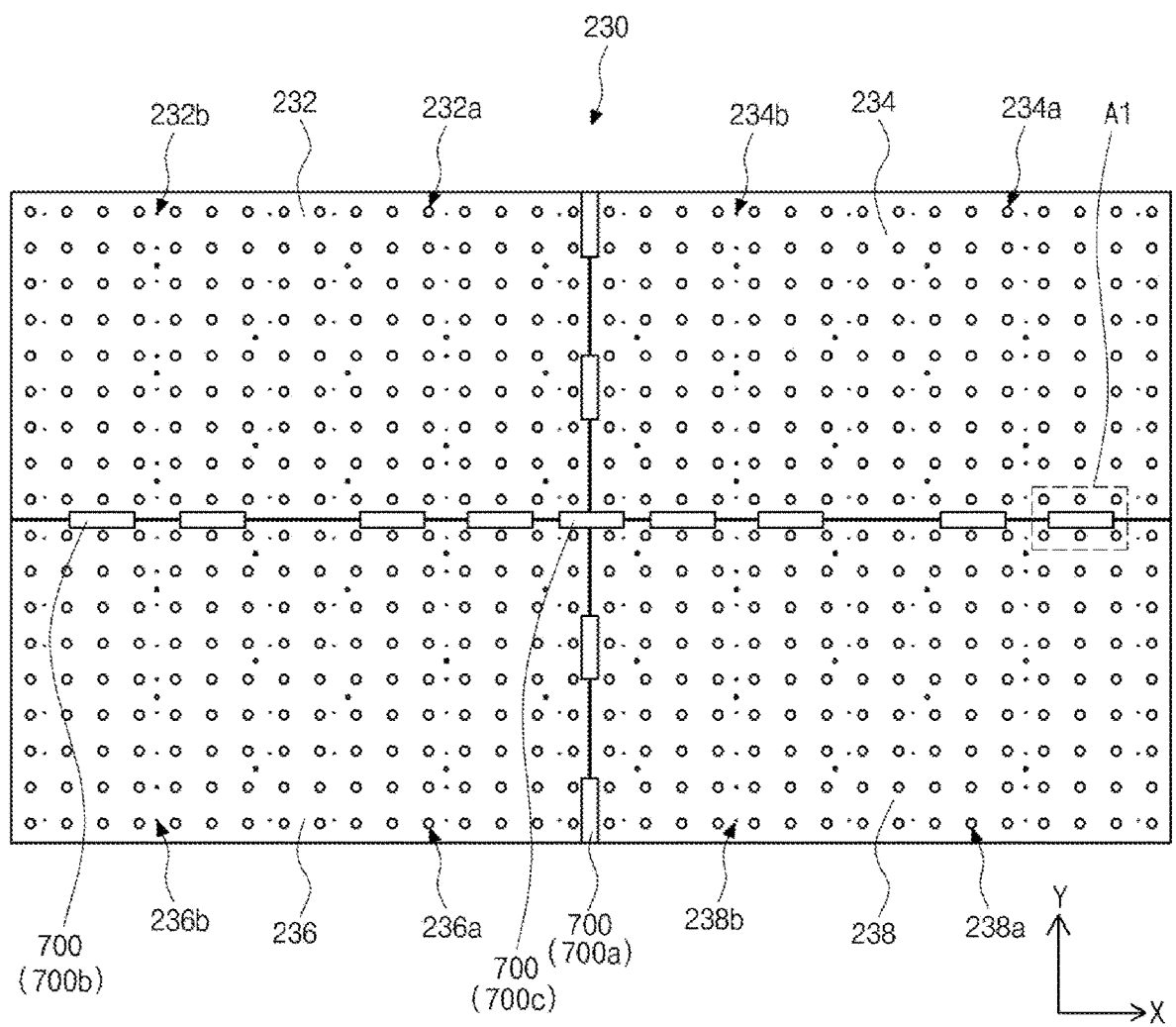
FIG. 3 is a schematic plan view of a reflector sheet of a backlight unit according to an aspect of the present disclosure.
Figure 4A:
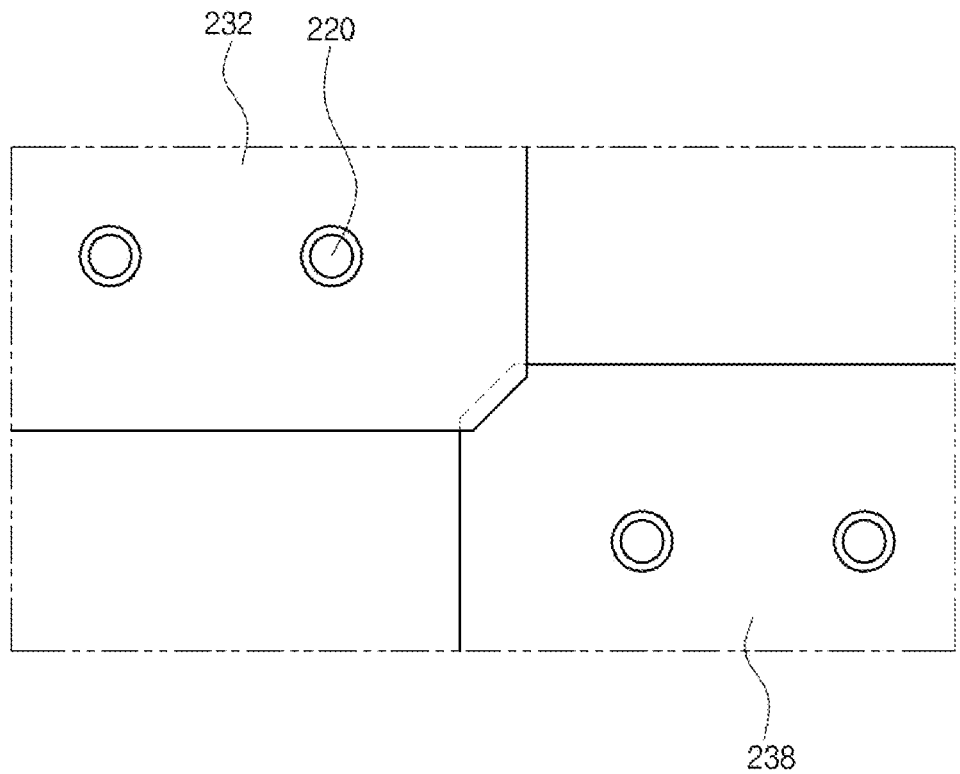
FIGS. 4A and 4B are enlarged plan views schematically illustrating an arrangement of sheet portions in accordance with an assembly order of a reflector sheet of a backlight unit according to an aspect of the present disclosure.
Figure 4B:
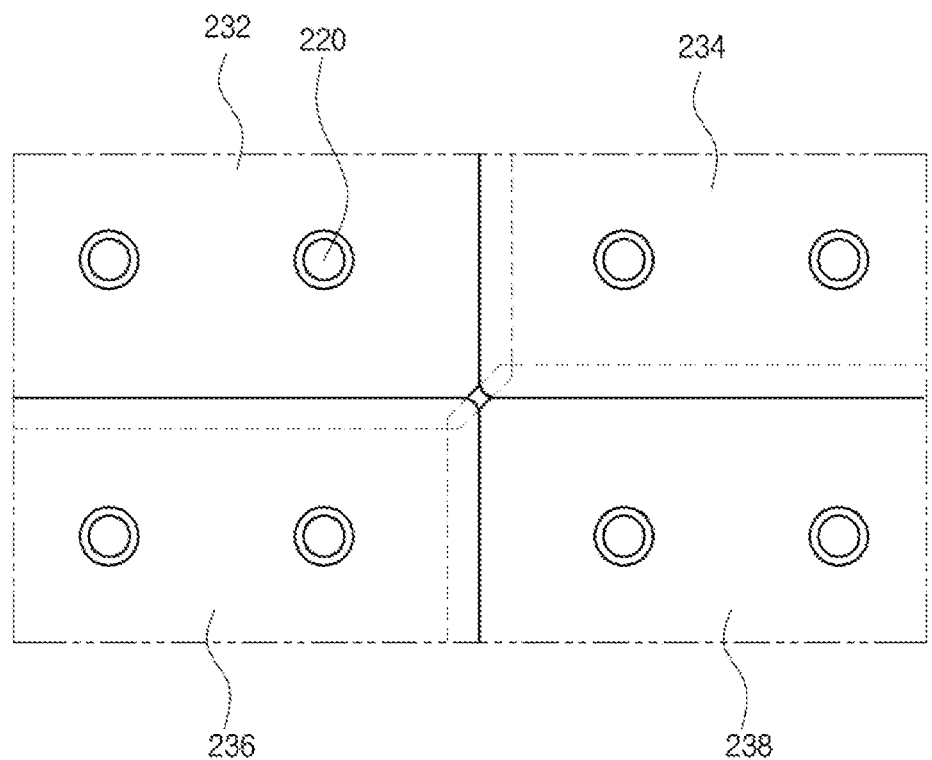

FIG. 3 is a schematic plan view of a reflector sheet of a backlight unit according to an aspect of the present disclosure, and FIGS. 4A and 4B are enlarged plan views schematically illustrating an arrangement of sheet portions in accordance with an assembly order of a reflector sheet of a backlight unit according to an aspect of the present disclosure.

In FIG. 3 and FIGS. 4A and 4B, the reflector sheet 230 of the backlight unit according to an aspect of the present disclosure may include the first, second, third, and fourth sheet portions 232, 234, 236, and 238. Here, the first sheet portion 232 and the second sheet portion 234 may be arranged adjacent to each other in the X direction, and the third sheet portion 236 and the fourth sheet portion 238 may be arranged adjacent to each other in the X direction. In addition, the first sheet portion 232 and the third sheet portion 236 may be arranged adjacent to each other in the Y direction, and the second sheet portion 234 and the fourth sheet portion 238 may be arranged adjacent to each other in the Y direction. Accordingly, the first, second, fourth, and third sheet portions 232, 234, 238, and 236 may be sequentially arranged in a clockwise direction.

Here, the X direction may be defined as a first direction, and the Y direction may be defined as a second direction. Alternatively, the Y direction may be defined as a first direction, and the X direction may be defined as a second direction.

Each of the first, second, third, and fourth sheet portions 232, 234, 236, and 238 may include a plurality of first holes 232a, 234a, 236a, and 238a and a plurality of second holes 232b, 234b, 236b, and 238b.

The first holes 232a, 234a, 236a, and 238a may be LED holes and may correspond to the LEDs 220 of FIG. 2, respectively. Accordingly, the LEDs 220 of FIG. 2 may be exposed through the corresponding first holes 232a, 234a, 236a, and 238a, respectively. In each of the first, second, third, and fourth sheet portions 232, 234, 236, and 238, the number of the first holes 232a, 234a, 236a, and 238a may be less than 150. For example, each of the first, second, third, and fourth sheet portions 232, 234, 236, and 238 may have 144 first holes 232a, 234a, 236a, and 238a.

In addition, the second holes 232b, 234b, 236b, and 238b may be screw holes for combining with the bottom cover 500 of FIG. 2. In each of the first, second, third, and fourth sheet portions 232, 234, 236, and 238, the number of the second holes 232b, 234b, 236b, and 238b may be smaller than the number of the first holes 232a, 234a, 236a, and 238a. However, the present disclosure is not limited thereto.

The assembly order of the first, second, third, and fourth sheet portions 232, 234, 236, and 238 may be determined by considering the amount of thermal expansion of the reflector sheet 230 and/or the bottom cover 500 of FIG. 2. As described above, the reflector sheet 230 may be formed of plastic such as polyethylene terephthalate (PET), and the bottom cover 500 of FIG. 2 may be formed of metal such as aluminum (Al) or electrolytic galvanized iron (EGI). The amount of thermal expansion of the reflector sheet 230 may vary depending on the material of the bottom cover 500 of FIG. 2.

Therefore, the first, second, third, and fourth sheet portions 232, 234, 236, and 238 may be assembled in consideration of the amount of thermal expansion of the reflector sheet 230 and/or the bottom cover 500 of FIG. 2, so that problems may not be caused even if the reflector sheet 230 contracts or expands due to temperature changes.

Here, when the reflector sheet 230 is combined with the bottom cover 500 of FIG. 2, the first and fourth sheet portions 232 and 238 may be fixed, while the second and third sheet portions 234 and 236 may be movable.

According to this, it is desirable that the first and fourth sheet portions 232 and 238 to be fixed may be first assembled as shown in FIG. 4A and then the second and third sheet portions 234 and 236 to be movable may be assembled as shown in FIG. 4B. Here, the assembly order of the first and fourth sheet portions 232 and 238 and the assembly order of the second and third sheet portions 234 and 236 may not be limited.

For example, the fourth, first, third, and second sheet portions 238, 232, 236, and 234 may be sequentially combined to each other. Alternatively, the first, fourth, second, and third sheet portions 232, 238, 234, and 236 may be sequentially combined to each other.

To allow the first and fourth sheet portions 232 and 238 fixed and allow the second and third sheet portions 234 and 236 movable when the reflector sheet 230 is combined with the bottom cover 500 of FIG. 2, the second holes 234b and 236b provided in the second and third sheet portions 234 and 236 may are larger than the second holes 232b and 238b provided in the first and fourth sheet portions 232 and 238.

Meanwhile, each of the first, second, third, and fourth sheet portions 232, 234, 236, and 238 may further include third holes corresponding to a plurality of support members 260 of FIG. 2, respectively.

The adjacent first, second, third, and fourth sheet portions 232, 234, 236, and 238 may overlap with each other and may be fixed by a plurality of reflective tapes 700.

For example, in the case of the reflector sheet 230 having a diagonal length of 98 inches, a total of thirteen reflective tapes 700 may be used. Specifically, two reflective tapes 700 may be used between the first and second sheet portions 232 and 234 adjacent to each other in the X direction, and two reflective tapes 700 may be used between the third and fourth sheet portions 236 and 238 adjacent to each other in the X direction. Four reflective tapes 700 may be used between the first and third sheet portions 232 and 236 adjacent to each other in the Y direction, and four reflective tapes 700 may be used between the second and fourth sheet portions 234 and 238 adjacent to each other in the Y direction. One reflective tape 700 may be used at a central area where the first, second, third, and fourth sheet portions 232, 234, 236, and 238 are adjacent to each other. However, the present disclosure is not limited thereto, and the number of the reflective tapes 700 may vary.

Each of the plurality of reflective tapes 700 may have at least one cutout, and the cutout may extend in a length direction of the reflective tape 700. Accordingly, first reflective tapes 700a between the first and second sheet portions 232 and 234 or between the third and fourth sheet portions 236 and 238 adjacent to each other in the X direction may have a cutout extending in the Y direction, and second reflective tapes 700b between the first and third sheet portions 232 and 236 or between the second and fourth sheet portions 234 and 238 adjacent to each other in the Y direction may have a cutout extending in the X direction. In addition, a third reflective tape 700c at the central area where the first, second, third, and fourth sheet portions 232, 234, 236, and 238 are adjacent to each other may have a cutout extending in the X direction and may further have a cutout extending in the Y direction.

The configurations of the reflector sheet 230 and the reflective tape 700 according to an aspect of the present disclosure will be described with reference to FIG. 5.

Figure 5:
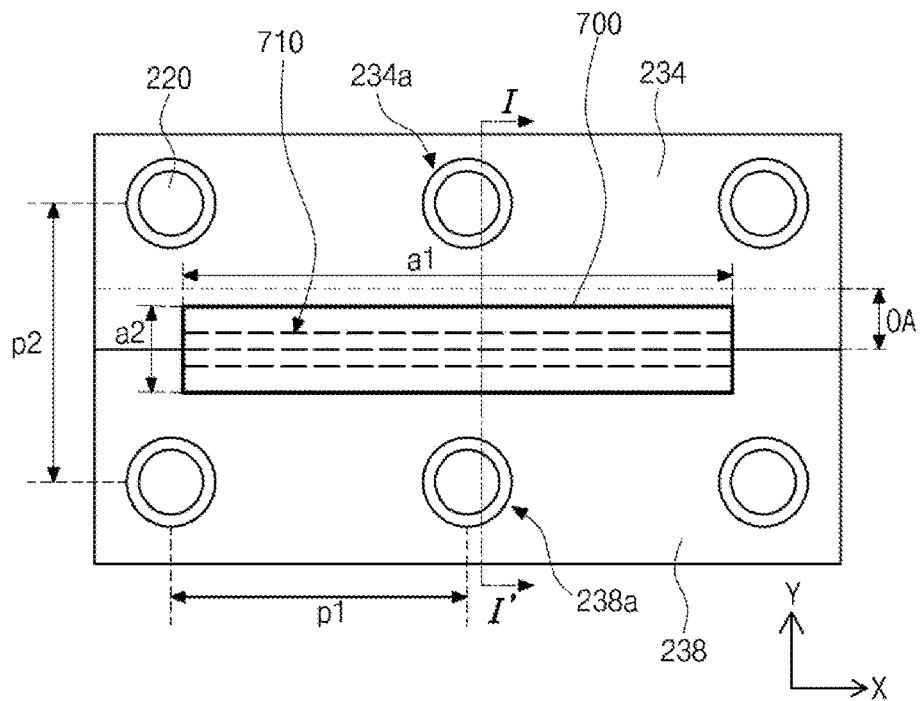
FIG. 5 is an enlarged plan view schematically illustrating the area A1 of FIG. 3.

FIG. 5 is an enlarged plan view schematically illustrating the area A1 of FIG. 3 and shows the LEDs together.

In FIG. 5, the second sheet portion 234 and the fourth sheet portion 238 may be arranged adjacent to each other in the Y direction. Each of the second sheet portion 234 and the fourth sheet portion 238 may have the plurality of first holes 234a and 238a, and the plurality of LEDs 220 may be disposed in the plurality of first holes 234a and 238a, respectively.

The plurality of LEDs 220 may be arranged at regular intervals and may be spaced apart from each other with a first pitch p1 and a second pitch p2 in the X direction and the Y direction, respectively. For example, each of the first and second pitches p1 and p2 may be 50 mm to 80 mm, beneficially 60 mm to 70 mm, more beneficially 65 mm to 70 mm, but the present disclosure is not limited thereto.

Here, the first pitch p1 may be greater than the second pitch p2. Alternatively, the first pitch p1 and the second pitch p2 may be the same.

The second sheet portion 234 may overlap with the fourth sheet portion 238 to form an overlapping area OA. A width of the overlapping area OA may be determined in consideration of contraction and expansion of the reflector sheet 230 and may be 20 nm to 30 nm, for example. However, the present disclosure is not limited thereto.

The second sheet portion 234 and the fourth sheet portion 238 may be fixed by the reflective tape 700. The reflective tape 700 may overlap with and contact the second sheet portion 234 and the fourth sheet portion 238.

The reflective tape 700 may have a length a1 of the X direction and a width a2 of the Y direction, and the length a1 may be greater than the width a2. The length a1 of the reflective tape 700 may be greater than the first pitch p1, and the width a2 may be smaller than the second pitch p2.

For example, the length a1 of the reflective tape 700 may be 60 mm to 80 mm, and the width a2 may be 20 mm to 30 mm. However, present disclosure is not limited thereto. If the length a1 is greater than 80 mm, the reflective tape 700 may be harder than the reflector sheet 230 of FIG. 3, so that wrinkles may be formed on the reflector sheet 230 of FIG. 3.

That is, since a thickness of the reflective tape 700 is thicker than a thickness of the reflector sheet 230 of FIG. 3, the reflective tape 700 may have lower flexibility than the reflector sheet 230 of FIG. 3. For example, the thickness of the reflector sheet 230 of FIG. 3 may be 0.2 mm to 0.3 mm, and the thickness of the reflective tape 700 may be greater than 0.3 mm and smaller than or equal to 0.4 mm. However, the present disclosure is not limited thereto.

Meanwhile, the reflective tape 700 may have a plurality of cutouts 710 extending in the X direction. The plurality of cutouts 710 may be provided in three rows spaced apart in the Y direction, and each row may include two or more cutouts 710 extending and spaced apart in the X direction. However, the present disclosure is not limited thereto, and the number of cutouts 710 may vary.

The plurality of cutouts 710 may impart flexibility to the reflector tape 700, so that the reflector tape 700 may be prevented from being detached from the second and fourth sheet portions 234 and 238 even if the reflector sheet 230 contracts or expands due to the temperature changes.

In addition, when the reflective tape 700 is attached, the cutouts 710 may be used as a guide line for an attachment location, so that the reflective tape 700 may be precisely attached to the overlapping area OA of the second and fourth sheet portions 234 and 238. Accordingly, it is possible to prevent detachment of the reflective tape 700 due to incorrect attachment.

Therefore, separation between the adjacent second and fourth sheet portions 234 and 238 may be prevented, mura may be prevented, and uniform luminance may be realized.

Figure 6A:
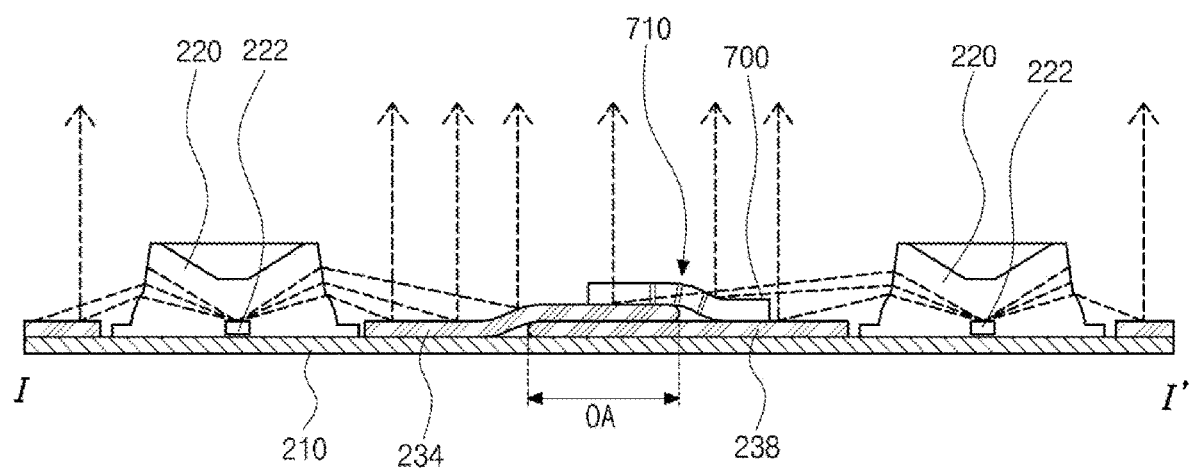
FIG. 6A is a schematic cross-sectional view of a reflector sheet and a reflective tape according to an aspect of the present disclosure.
Figure 6B:
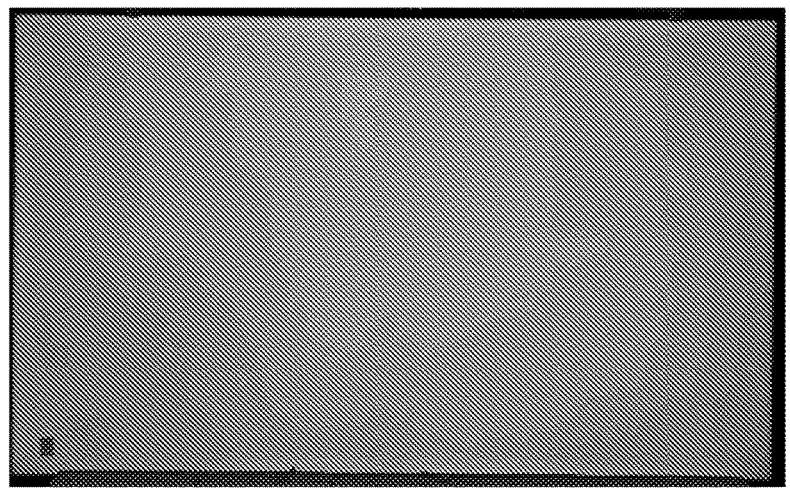
FIG. 6B is a view showing reliability evaluation results of the reflector sheet and the reflective tape according to an aspect of the present disclosure.
Figure 7A:
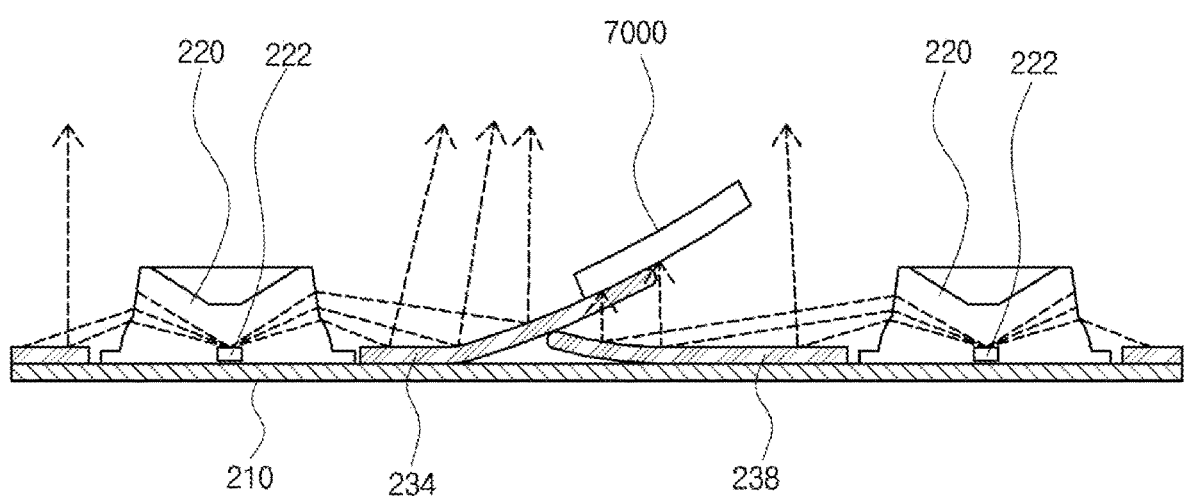
FIG. 7A is a schematic cross-sectional view of a reflector sheet and a reflective tape according to a comparative example.
Figure 7B:
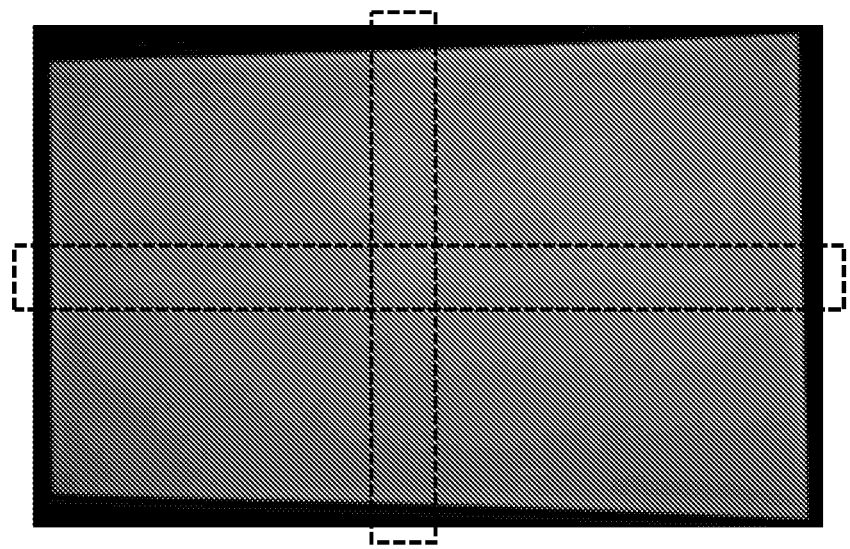
FIG. 7B is a view showing reliability evaluation results of the reflector sheet and the reflective tape according to a comparative example.

FIG. 6A is a schematic cross-sectional view of a reflector sheet and a reflective tape according to an aspect of the present disclosure and illustrates a cross-section corresponding to the line I-I' of FIG. 5, and FIG. 6B is a view showing reliability evaluation results of the reflector sheet and the reflective tape according to an aspect of the present disclosure. FIG. 7A is a schematic cross-sectional view of a reflector sheet and a reflective tape according to a comparative example, and FIG. 7B is a view showing reliability evaluation results of the reflector sheet and the reflective tape according to a comparative example.

In FIG. 6A, the second sheet portion 234 and the fourth sheet portion 238 having the overlapping area OA may be disposed on the printed circuit board 210, and the reflective tape 700 may overlap with and contact the second sheet portion 234 and the fourth sheet portion 238 to thereby fix the second and fourth sheet portions 234 and 238.

Here, the reflective tape 700 may have the plurality of cutouts 710, and some of the plurality of cutouts 710 may correspond to one end of the overlapping area OA.

The detachment of the reflective tape 700 due to the temperature changes may be prevented by the plurality of cutouts 710, so that light from the LED chip 222 of the LED 220 may be uniformly reflected by the second and fourth sheet portions 234 and 238.

Accordingly, as shown in FIG. 6B, it may be seen that mura does not occur at the joined part of the divided portions of the reflector sheet.

On the other hand, in FIG. 7A, a reflective tape 7000 according to the comparative example does not include a cutout. In this case, as the second and fourth sheet portions 234 and 238 contract and expand due to the temperature changes, the reflective tape 7000 is detached from the fourth sheet portion 238, and a separation occurs between the second and fourth sheet portions 234 and 238.

Therefore, light from the LED chip 222 of the LED 220 is non-uniformly reflected by the second and fourth sheet portions 234 and 238, and a brighter area occurs compared to other areas.

Accordingly, as shown in FIG. 7B, it may be seen that mura occurs at the joined part of the divided portions of the reflector sheet.

The reflective tape 700 of the present disclosure will be described in detail with reference to FIGS. 8 to 10.

Figure 8:
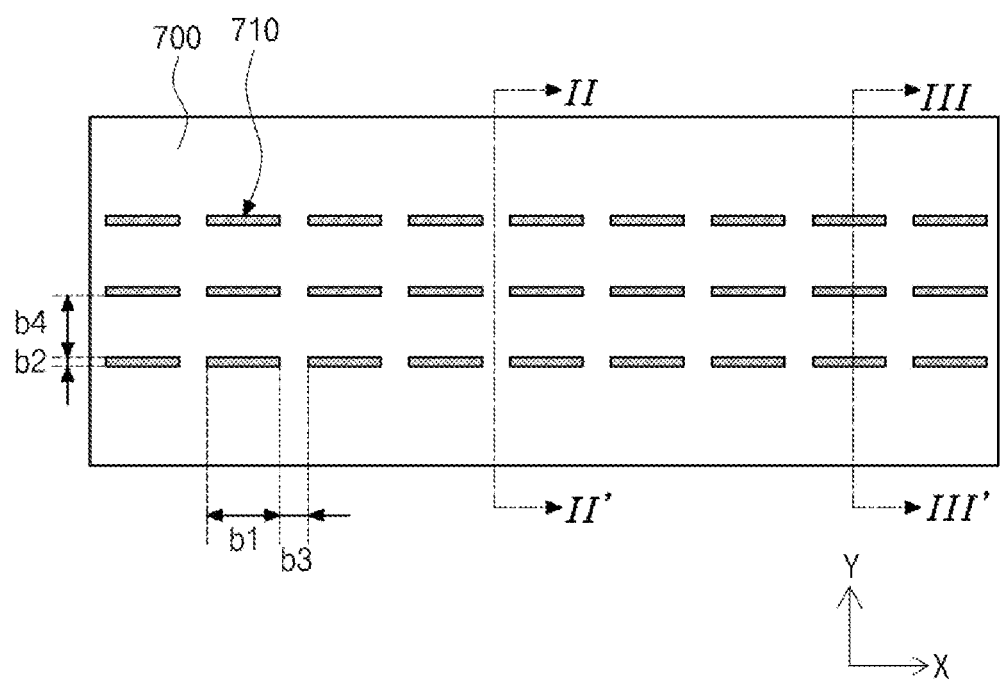
FIG. 8 is a plan view schematically illustrating a reflective tape according to an aspect of the present disclosure.

FIG. 8 is a plan view schematically illustrating a reflective tape according to an aspect of the present disclosure.

In FIG. 8, the reflective tape 700 according to the aspect of the present disclosure may have a rectangular shape with a length of the X direction and a width of the Y direction and may have a plurality of cutouts 710 extending in the X direction.

Specifically, each of the plurality of cutouts 710 may have a first length b1 in the X direction and a second length b2 in the Y direction. The first length b1 is greater than the second length b2.

In addition, each of the plurality of cutouts 710 may be spaced apart with a first interval b3 in the X direction and spaced apart with a second interval b4 in the Y direction.

Here, the first length b1 and the first interval b3 of the plurality of cutouts 710 may have a ratio of about 3:1, so that the reflective tape 700 may have flexibility against thermal expansion.

Further, the first length b1 and the second interval b4 may be the same. Alternatively, the first length b1 and the second interval b4 may be different.

For example, the first length b1 may be 4.5 mm to 7 mm, the second length b2 may be 0.3 mm to 1.3 mm, the first interval b3 may be 1.6 mm to 2.3 mm, and the second interval b4 may be 5 mm to 6 mm. However, the present disclosure is not limited thereto, and the first and second lengths b1 and b2 and the first and second intervals b3 and b4 may vary according to the size of the reflective tape 700.

In FIG. 8, although it is shown that three cutouts 710 are provided in the Y direction, the present disclosure is not limited thereto.

Figure 9:
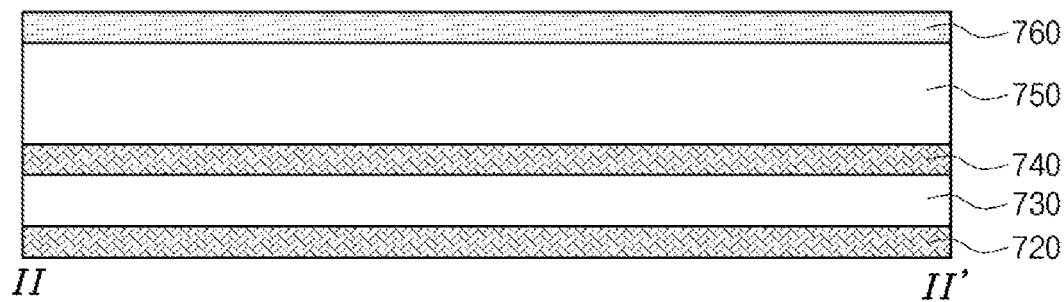
FIG. 9 is a cross-sectional view corresponding to line II-II' of FIG. 8.
Figure 10:
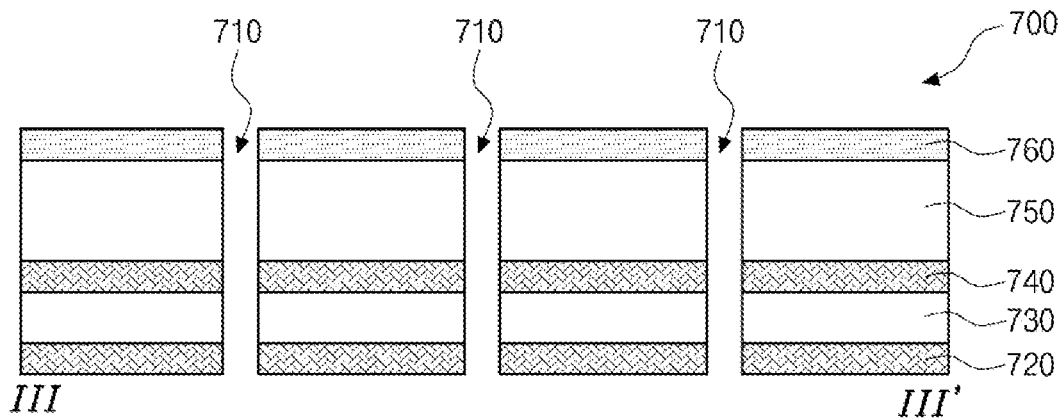
FIG. 10 is a cross-sectional view corresponding to line of FIG. 8.

FIG. 9 and FIG. 10 are views illustrating cross-sections of a reflective tape according to an aspect of the present disclosure. FIG. 9 is a cross-sectional view corresponding to line II-IF of FIG. 8, and FIG. 10 is a cross-sectional view corresponding to the line of FIG. 8.

In FIG. 9 and FIG. 10, the reflective tape 700 may include first, second, third, fourth, and fifth layers 720, 730, 740, 750, and 760 sequentially stacked.

The first layer 720 and the third layer 740 may be first and second adhesive layers and may be formed of an acrylic or silicone material. The second layer 730 may be a base layer and maintain a structure of the reflective tape 700. The second layer 730 may be formed of polyethylene terephthalate (PET).

The fourth layer 750 may be a reflecting layer and may be formed of stretched polyethylene terephthalate. The fifth layer 760 may be a diffusing layer and may be formed by coating a diffusion agent. TiO2, microbeads, or PET beads may be used as the diffusion agent, and a matrix material and the diffusion agent may be dispersed in a solvent and then coated.

Here, the first, second, and third layers 720, 730, and 740 may constitute a double-sided tape, and the fourth and fifth layers 750 and 760 may constitute a reflection unit. That is, the reflective tape 700 may include a double-sided tape 720, 730, and 740 and a reflection unit 750 and 760, and the double-sided tape 720, 730, and 740 may be disposed between the reflection unit 750 and 760 and the reflector sheet 230 of FIG. 3.

Accordingly, while the reflector sheet 230 of FIG. 3 may be fixed through the double-sided tape 720, 730, and 740, the reflection unit 750 and 760 may be attached to the reflector sheet 230 of FIG. 3 to reflect light.

A thickness of the reflection unit 750 and 760 may be thicker than a thickness of the double-sided tape 720, 730, and 740. More particularly, a thickness of the fourth layer 750, which is a reflecting layer, may be thicker than the thickness of the double-sided tape 720, 730, and 740. Accordingly, the thickness of the fourth layer 750 may be thicker than a thickness of the second layer 730, which is a base layer.

In addition, the first and third layers 720 and 740, which are adhesive layers, may have the same thickness, and the thickness of each of the first and third layers 720 and 740 may be smaller than the thickness of the second layer 730.

Meanwhile, a thickness of the fifth layer 760, which is a diffusing layer, may be smaller than the thickness of each of the first, second, third, and fourth layers 720, 730, 740, and 750. Therefore, the thickness of the fifth layer 760 may be smaller than the thickness of each of the first and third layers 720 and 740.

For example, the thickness of each of the first and third layers 720 and 740 may be 25 μm, the thickness of the second layer 730 may be 50 μm, the thickness of the fourth layer 750 may be 225 μm, and the thickness of the fifth layer 760 may be 20 μm. However, the present disclosure is not limited thereto.

As described above, the reflective tape 700 may include the plurality of cutouts 710, and the plurality of cutouts 710 may be formed through the first, second, third, fourth, and fifth layers 720, 730, 740, 750, and 760.

Accordingly, when the reflective tape 700 is attached between the stepped area of the adjacent first, second, third, and fourth sheet portions 232, 234, 236 and 238 of the reflector sheet 230 of FIG. 3, even if the reflector sheet 230 of FIG. 3 contracts and expands due to the temperature changes, the first, second, third, and fourth sheet portions 232, 234, 236, and 238 of FIG. 3 are not separated or detached because the reflective tape 700 has fluidity.

Therefore, it is possible to prevent light leakage.

The reflective tape 700 of the present disclosure may include cutouts having different configurations according to the joined part.

Figure 11:
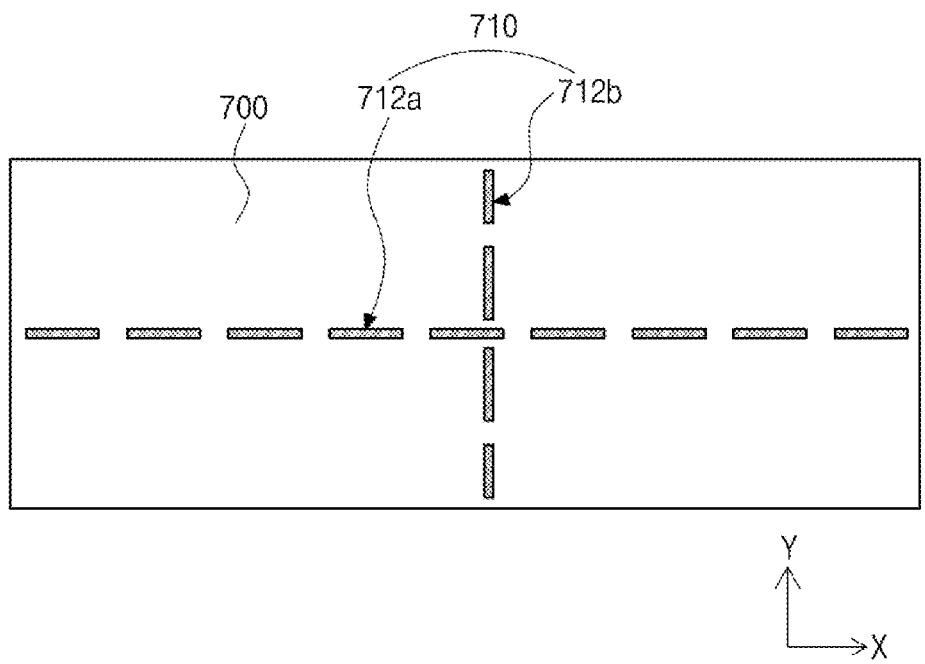
FIG. 11 and FIG. 12 are plan views schematically illustrating configurations of reflective tapes according to other aspects of the present disclosure.
Figure 12:
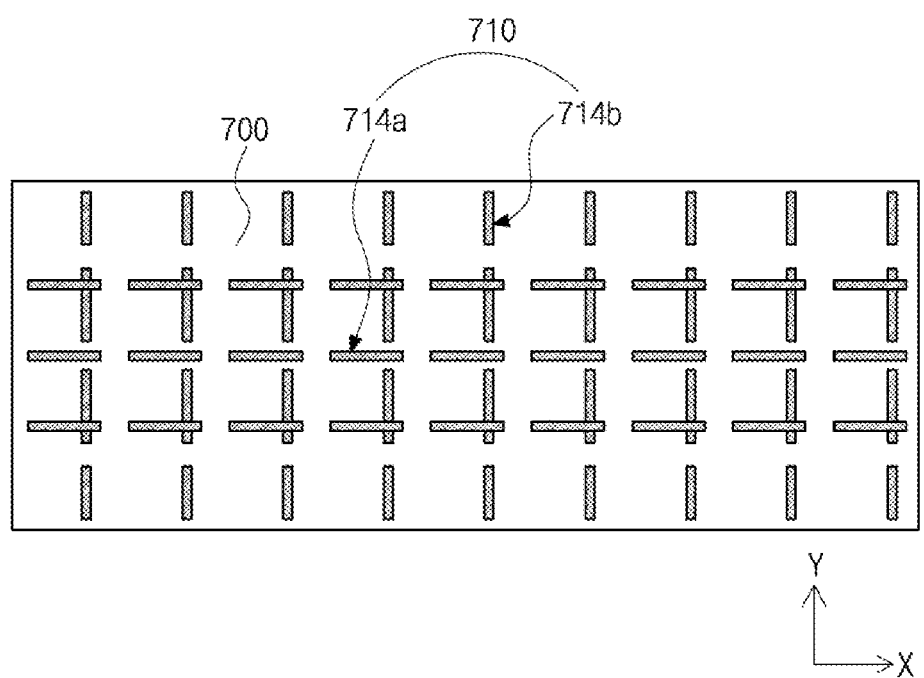

FIG. 11 and FIG. 12 are plan views schematically illustrating configurations of reflective tapes according to other aspects of the present disclosure.

In FIG. 11, the reflective tape 700 according to another aspect of the present disclosure may include a plurality of cutouts 710. The cutouts 710 may include first cutouts 712a extending and spaced apart in the X direction and second cutouts 712b extending and spaced apart in the Y direction.

The first cutouts 712a may be provided as a single row and may be disposed along the center of the reflective tape 700 in the Y direction. The second cutouts 712b may be provided as a single row and may be disposed along the center of the reflective tape 700 in the X direction.

Alternatively, in FIG. 12, the reflective tape 700 according to another aspect of the present disclosure may include a plurality of cutouts 710. The cutouts 710 may include a plurality of first cutouts 714a extending and spaced apart in the X direction and a plurality of second cutouts 714b extending and spaced apart in the Y direction.

The first cutouts 714a and second cutouts 714b may be provided as a plurality of rows. For example, the first cutouts 714a may be provided as three rows, and the second cutouts 714b may be provided as nine rows. However, the present disclosure is not limited thereto.

The reflective tapes 700 of FIG. 11 and FIG. 12 may be applied to the central area of the reflector sheet 230, that is, may be used as the third reflective tape 700c disposed in the area where the first, second, third, and fourth sheet portions 232, 234, 236, and 238 are adjacent to each other.

Figure 13:
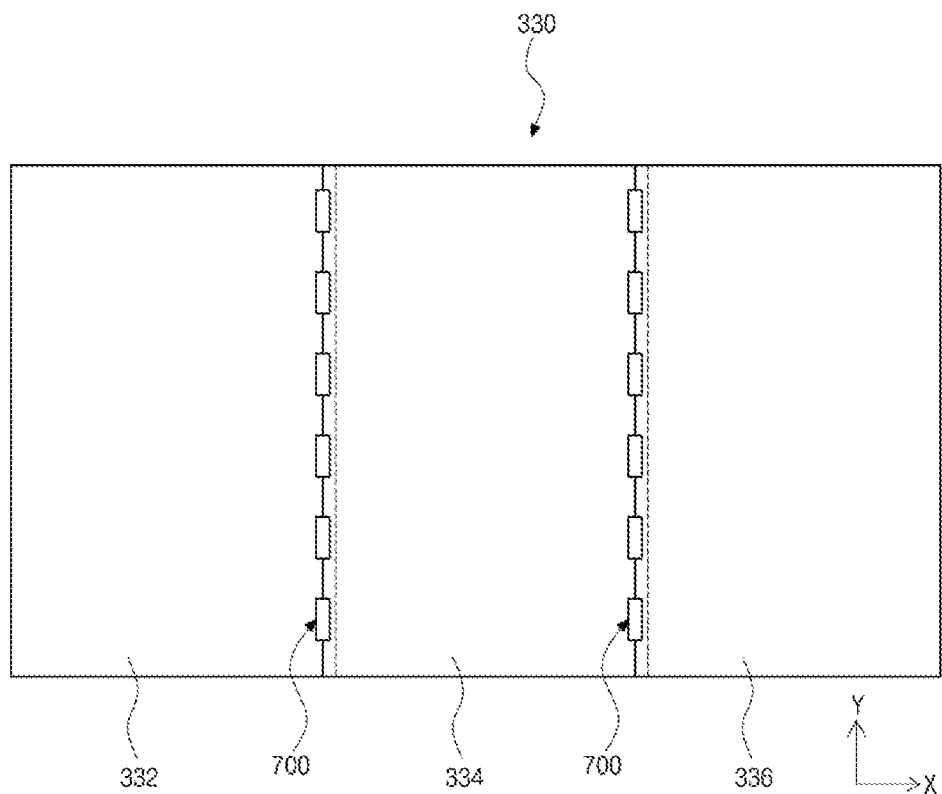
FIG. 13 is a plan view schematically illustrating another reflector sheet according to an aspect of the present disclosure.

FIG. 13 is a plan view schematically illustrating another reflector sheet according to an aspect of the present disclosure. Here, the reflector sheet may be divided into three portions.

In FIG. 13, another reflector sheet 330 according to an aspect of the present disclosure may include first, second, and third sheet portions 332, 334, and 336. Here, the first sheet portion 332 and the second sheet portion 334 may be arranged adjacent to each other in the X direction, and the second sheet portion 334 and the third sheet portion 336 may be arranged adjacent to each other in the X direction. Therefore, the second sheet portion 334 may be disposed between the first and third sheet portions 332 and 336.

Although not shown in the figure, each of the first, second, and third sheet portions 332, 334, and 336 may include a plurality of first holes as an LED hole and a plurality of second holes as a screw hole.

Here, adjacent ones of the first, second, and third sheet portions 332, 334, and 336 may overlap with each other. The second sheet portion 334 may be disposed over the first sheet portion 332, and the third sheet portion 336 may be disposed over the second sheet portion 334.

The adjacent first, second, and third sheet portions 332, 334, and 336 may be fixed by a plurality of reflective tapes 700. In this case, each of the plurality of reflective tapes 700 may have a plurality of cutouts extending in the Y direction.

Each of the reflective tapes 700 may have the configuration corresponding to those shown in FIGS. 8 to 12.

In the above aspects, although the configuration in which the reflector sheet is divided into three or four sheet portions has been described, the number of the divided portions of the reflector sheet of the present disclosure is not limited thereto and may be applied in various ways.

In the present disclosure, by dividing the reflector sheet, it is possible to provide a backlight unit having a relatively large size and a liquid crystal display device including the same.

In addition, by fixing the divided reflector sheet using a reflective tape with cutouts, the reflective tape may have fluidity. Thus, when the reflective tape contracts and expands due to the temperature changes, separation between the adjacent second and fourth sheet portions 234 and 238 may be prevented, and mura may be prevented.

Further, when the reflective tape is attached, the reflective tape may be precisely attached to the divided reflector sheet using the cutouts, so that it is possible to facilitate work and prevent detachment of the reflective tape 700 due to incorrect attachment.

It will be apparent to those skilled in the art that various modifications and variations may be made in the display device of the present disclosure without departing from the technical idea or scope of the disclosure. Thus, it is intended that aspects of the present disclosure cover the modifications and variations of the disclosure provided they come within the scope of the appended claims and their equivalents.

What is claimed is:

1. A liquid crystal display device, comprising:
   a bottom cover;
   a backlight unit disposed over the bottom cover and including a light source and a reflector sheet; and
   a liquid crystal panel disposed over the backlight unit,
   wherein the reflector sheet includes first and second sheet portions adjacent to each other in a first direction and the first and second sheet portions are fixed with at least one first reflective tape, and
   wherein the at least one first reflective tape includes a plurality of cutouts extending in a second direction perpendicular to the first direction.

2. The liquid crystal display device of claim 1, wherein each of the plurality of cutouts has a first length of the second direction and a second length of the first direction, and the first length is greater than the second length.

3. The liquid crystal display device of claim 2, wherein the plurality of cutouts are spaced apart with a first interval in the second direction, and the first length is greater than the first interval.

4. The liquid crystal display device of claim 3, wherein the plurality of cutouts are spaced apart with a second interval in the first direction, and the second length is smaller than the second interval.

5. The liquid crystal display device of claim 4, wherein the plurality of cutouts are provided in three rows spaced apart in the first direction, and each row comprises two or more cutouts extending and spaced apart in the second direction.

6. The liquid crystal display device of claim 1, wherein the at least one first reflective tape includes a double-sided tape and a reflection unit, and the double-sided tape is disposed between the reflection unit and the reflector sheet.

7. The liquid crystal display device of claim 6, wherein the reflection unit includes a reflecting layer, and a thickness of the reflecting layer is thicker than a thickness of the double-sided tape.

8. The liquid crystal display device of claim 7, wherein the reflecting layer is formed of stretched polyethylene terephthalate.

9. The liquid crystal display device of claim 7, wherein the reflection unit further includes a diffusing layer, and the reflection unit is disposed between the double-sided tape and the diffusing layer.

10. The liquid crystal display device of claim 1, wherein the reflector sheet further includes a third sheet portion adjacent to the first sheet portion in the second direction, a fourth sheet portion adjacent to the second sheet portion in the second direction, and a second reflective tape fixing at least one of the first and third sheet portions and the second and fourth sheet portions, and
   wherein the second reflective tape includes a plurality of cutouts extending in the first direction.

11. The liquid crystal display device of claim 10, wherein the reflector sheet further includes a third reflective tape fixing the first, second, third, and fourth sheet portions adjacent to each other, and wherein the third reflective tape includes a plurality of first cutouts extending in the first direction and a plurality of second cutouts extending in the second direction.

12. The liquid crystal display device of claim 11, wherein the light source includes a plurality of light emitting diodes (LEDs), wherein each of the first, second, third, and fourth sheet portions has first holes respectively corresponding to the plurality of LEDs and second holes for combining with the bottom cover, and wherein the first and fourth sheet portions are disposed between the bottom cover and the second and third sheet portions.

13. The liquid crystal display device of claim 12, wherein the second holes of the second and third sheet portions are larger than the second holes of the first and fourth sheet portions.

14. The liquid crystal display device of claim 1, wherein the backlight unit further includes a printed circuit board on which the light source is mounted, a diffuser plate over the reflector sheet, and an optical sheet over the diffuser plate.

15. The liquid crystal display device of claim 14, further comprising:

a guide panel disposed between the backlight unit and the liquid crystal panel; and a support main disposed under the guide panel and supporting the diffuser plate and the optical sheet.

16. The liquid crystal display device of claim 1, wherein the reflector sheet further includes a third sheet portion adjacent to the second sheet portion in the first direction, and wherein the at least one first reflective tape fixes the second and third sheet portions.

17. The liquid crystal display device of claim 16, wherein adjacent ones of the first, second, and third sheet portions overlap with each other.

\* \* \* \* \*